United States Patent [19]

Grimminger et al.

[11] Patent Number: 4,863,364
[45] Date of Patent: Sep. 5, 1989

[54] SCREW TIP OF AN EXTRUDER SCREW

[75] Inventors: Albert Grimminger, Leonberg; Franz-Josef Müller; Hans-Joachmi Sämann, both of Bietigheim-Bissingen, all of Fed. Rep. of Germany

[73] Assignee: Werner & Pfleiderer GmbH, Stuttgart, Fed. Rep. of Germany

[21] Appl. No.: 220,460

[22] Filed: Jul. 18, 1988

[30] Foreign Application Priority Data

Jul. 16, 1987 [DE] Fed. Rep. of Germany ....... 3723456

[51] Int. Cl.$^4$ .............................................. B29C 47/64
[52] U.S. Cl. ................................ 425/208; 264/211.21; 264/211.23; 366/80
[58] Field of Search .................... 425/208; 366/79–81, 366/83, 85, 88, 90, 78; 239/486, 584; 264/211.21, 211.23

[56] References Cited

U.S. PATENT DOCUMENTS

| | | | |
|---|---|---|---|
| 3,335,461 | 8/1967 | Schwartz | 425/208 X |
| 3,942,774 | 3/1976 | Sokolow | 366/81 X |
| 4,112,516 | 9/1978 | Hotz | 366/80 |
| 4,124,347 | 11/1978 | Miller | 366/90 X |
| 4,218,146 | 8/1980 | Housz | 366/78 |

FOREIGN PATENT DOCUMENTS

| | | | |
|---|---|---|---|
| 2053646 | 5/1972 | Fed. Rep. of Germany | 366/79 |
| 1153678 | 5/1969 | United Kingdom | 366/79 |
| 2052281 | 1/1981 | United Kingdom | 425/208 |

OTHER PUBLICATIONS

Schenkel, G.; *Kunststoff-Extrudertechnik;* Published by Carl Hanser Verlag; Munich, 1963; pp. 236, 237.

*Primary Examiner*—Richard L. Chiesa
*Attorney, Agent, or Firm*—Roberts, Spiecens & Cohen

[57] ABSTRACT

An extruder for the extrusion of a material composed of a mixture of substances in which an extruder screw is rotatably mounted in a feed channel of a housing for advancing the material to an outlet, of the channel whereat a screw tip is coaxially mounted on the extruder screw and is disposed with clearance in a distributor channel extending in prolongation of the feed channel to receive the material from the extruder screw and feed the material to a discharge outlet of the distributor channel. The screw tip has a discharge surface at an end thereof remote from the extruder screw, which includes a plurality of surface portions ascending generally helically in the direction of flow of the material. The surface portions can be flat or form a continuous discharge surface. A conveyor channel for material is formed in the screw tip and extends over an angular portion of the screw tip from a radial discharge edge of the discharge surface so that the conveyor channel is entirely open at the outer periphery of the screw tip.

15 Claims, 3 Drawing Sheets

SCREW TIP OF AN EXTRUDER SCREW

FIELD OF THE INVENTION

The present invention relates to an extruder for extruding mixtures of substances having a helical screw rotatable in a feed channel in a housing, the screw having a cylindrical screw tip positioned in a distribution channel at the end of the feed channel, the screw tip having an end with a discharge surface which is inclined with respect to the axis of the rotation of the screw.

DESCRIPTION OF PRIOR ART

The development and function of the shape of all types of screw tips mounted at the free end of the screw are disclosed in Schenkel-Kunststoff-Extruder Technique, published by Carl Hanser Verlag of Munich, 1963, pages 236/237. The screw tips serve the purpose of providing a flow-favoring passage for the stream of material conveyed by the extruder screw within the discharge channel. The stream of material which is fed via the discharge channel to one or more extrusion nozzles must have a substantially uniform temperature profile in order to assure satisfactory quality of the product.

The known construction of screw tips does not adequately satisfy this requirement since, while the tips prevent accumulation of residues from of the stream of material in so-called dead zones, they nevertheless leave the stream unchanged with respect to its non-homogeneous temperature profile in edge and center zones. A spirally layered stream of material passing from the feed channel of the extruder at different temperature profiles flows substantially unchanged through the distribution channel.

Furthermore, the product layers coming from the region of the center zone are additionally heated and discharged, undivided, by the surfaces of the rotating screw tips due to the shearing energy developed by the screw tips. The conventional screw tips having end discharge surfaces inclined with respect to the axis of the screw also do not prevent the direct passage of the hot outer edge layers of the stream of substance into the distributor channel. Furthermore, a dead space is formed in the region of the center of the screw tip, from which dead space the stream of material is only discharged slowly in the form of a hot string.

SUMMARY OF THE INVENTION

An object of the present invention is so to provide a screw tip at the end of the extruder screw by which the stream of material emerging from the feed channel is fed to the subsequent extrusion region with a homogeneous temperature distribution.

It has been found that with suitable shaping of the screw tip, the stream of material is pulled out to form a thin-layered stratum. Namely, the screw tip is shaped so that the stream of material is guided over radially extending flow surfaces and conducted over a discharge edge.

In accordance with the invention, the screw tip has a discharge surface at an end thereof remote from the extruder screw and the discharge surface is formed by a plurality of individual surface portions which ascend generally helically in the direction of flow of the material. A conveyor channel is formed in the screw tip and extends over a portion of the periphery thereof to form a core section which extends to the axis of the screw tip so that material can flow in the conveyor channel and be laterally discharged therefrom without restriction. The radial discharge edge is formed at the end of the conveyor channel.

In accordance with the construction of the extruder of the invention, the stream of material, after its emergence from the feed channel, is picked up by the helically inclined individual surface portions of the screw tip which collectively form the discharge surface and is discharged, by the rotary movement of the screw tip at the outer circumference over the length of the surface portions. The delivery takes place in a distribution over the entire length of the individual surface portions outside the center of rotation of the extruder screw so that the stream of material is reformed into a thin spiral-shaped stratum. This distribution takes place essentially on the basis of the conveying action which is imposed upon the mixture of materials over the individual surface portions limited by the center section, the mixture of substances discharging as a whole being finally subjected to a mixing action by means of the radially extending discharge edge. As a result, all product layers emerging non-homogeneous manner from the extruder screw are picked up and fed to the extrusion nozzles with a homogeneous temperature distribution.

By making the individual surface portions of the screw tip flat, a simple construction is obtained which is economical to produce.

In accordance with a feature of the invention, the individual surface portions of the screw tip form a continuous helically ascending discharge surface at a helical angle of 10°–30° which provides a uniform flow distribution of the mixture of materials over the entire discharge surface and thus a uniform discharge over the outer circumference and the discharge edge, particularly in the case of mixtures of substances which contain abrasive fillers.

In accordance with a further feature of the invention, the screw tip is formed with a core bounded by curved surfaces which favor the flow in the region of the discharge surface to that dead zones and the formation of injurious residues of product are effectively prevented.

The extruder screw is frequently formed of individual screw elements tightly engaged one behind the other in threaded axial alignment. In accordance with another feature of the invention, the screw tip has a threaded cylindrical stud coaxially engaged in a threaded bore in the endmost screw element thus enabling the attachment of the screw tip to the screw shaft without additional means.

BRIEF DESCRIPTION OF THE FIGURES OF THE DRAWING

The invention will be described in detail hereafter with reference to embodiments thereof shown in the drawing in which.

DETAILED DESCRIPTION OF PREFERRED EMBODIMENTS

Figure 1:
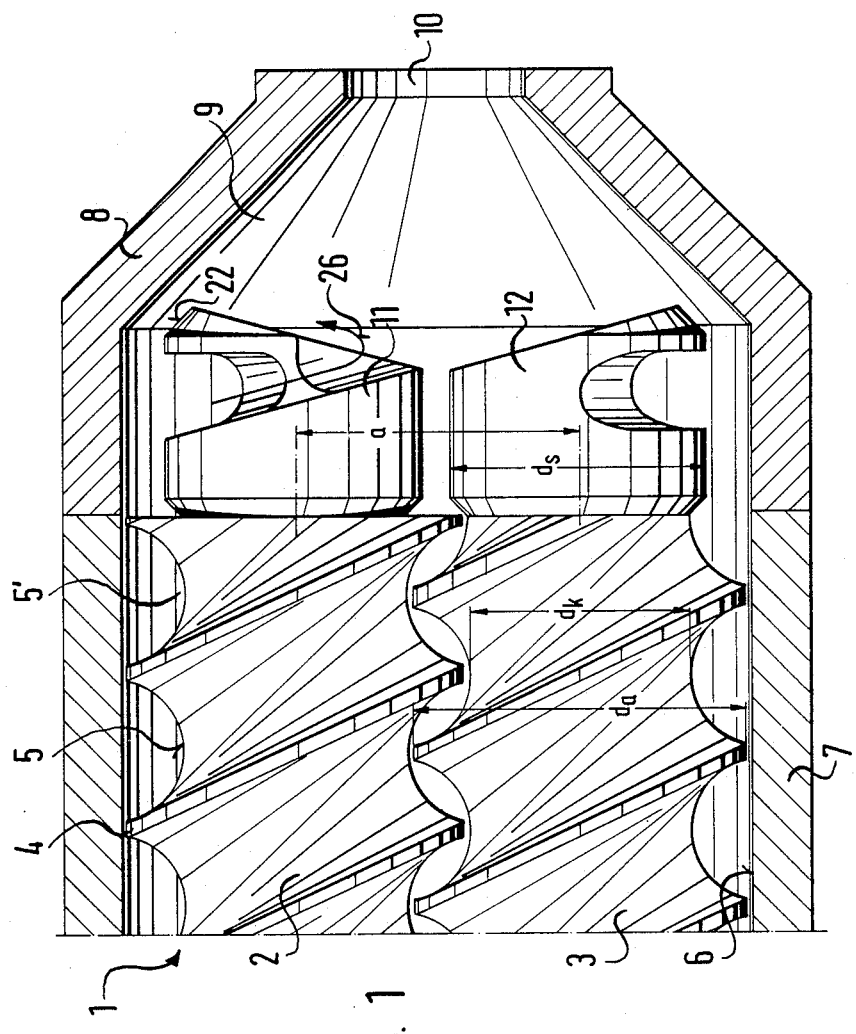
FIG. 1 is a longitudinal sectional view through the end region of a two-shaft extruder having screw tips according to the invention.

FIG. 1 shows the discharge end of an extruder 1 having two parallel extruder shafts 2, 3 driven in rotation about parallel axes. The shafts 2, 3 have screw helixes 4 which are offset axially to interengage one another for scraping material from the bottom of screw channels 5, 5' and from the inner wall 6 of the feed channel in housing 7.

At its discharge end, the housing 7 is connected to a mouthpiece 8 having a conical distribution channel 9 into which the extruder screws 2, 3 discharge the material to be extruded. The mouthpiece 8 has an extruder nozzle 10 which serves for the extruding proper of the mixture of substances fed by the extruder screws 2, 3, into the desired profile shape of the extruded product.

Figure 2:
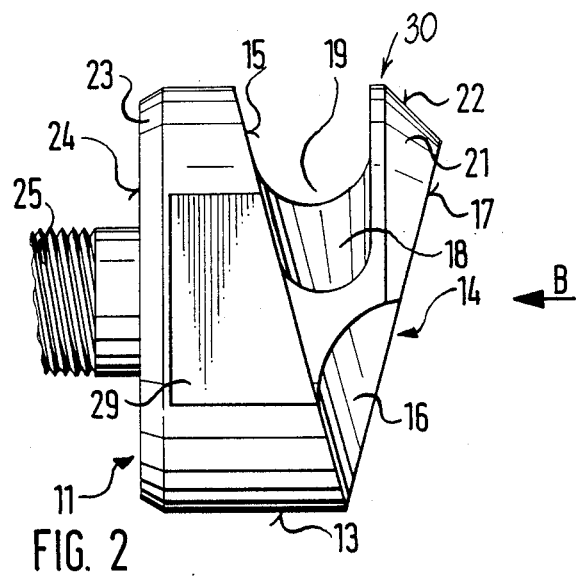
FIG. 2 is a side view of the screw tip alone showing its discharge surface formed from individual flat surfaces.

Screw tips 11 and 12 are mounted at the outlet end of the screw channels 5, 5' for receiving the stream of material conveyed through the screw channels 5, 5' of the extruder screws 2 and 3 respectively and in turn for conveying the material into the distribution channel 9 after rearranging the material along a conveyance path designated by the arrow 26 in FIG. 2. Furthermore, the screw tips 11, 12 effect a thorough mixing of the stream of material.

Figure 3:
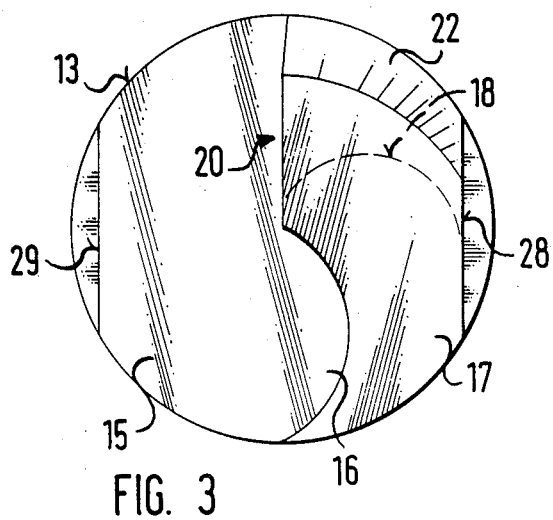
FIG. 3 is a top view of the screw tip in FIG. 2 as seen in the direction of arrow B in FIG. 2.

The screw tips 11, 12 are of identical construction and will be described with reference to screw tip 11 in FIGS. 2 and 3. For achieving the thorough mixing of the material, the screw tip is constructed as shown in FIGS. 2 and 3 with a cylindrical outer circumference 13 at the end of which there is formed a discharge surface 14 comprised of a plurality of individual surface portions 15, 16 and 17 which ascend helically in the direction of flow of the stream of substances. The surface portions 15, 16 are limited by a center or core section 18, so that, in this way, a conveyor channel 19 is formed which discharges material without lateral limitation by the individual surface portion 17. The center section 18 has an outer surface, which laterally limits the surface portions 15, 16 and as seen particularly in FIGS. 2 and 3, the outer surface of center section 18 is substantially semi-circular in extent as seen in FIG. 3 and is concave in shape as seen in FIG. 2. The outer surface of center section 18 can have any other geometrical configuration so as to form conveyor channel 19 with a curved concave bounding surface.

The surface portion 17 which adjoins the conveyor channel 19 in the direction of conveyance terminates in a radially extending discharge edge 20. The front surface 21 of the discharge edge 20 exerts a mixing function. The surface 21 lies in a plane passing through the axis of the screw tip. The surface portion 17 is formed at its cylindrical outer circumference with a bevel 22 which is conically tapered in correspondence with the conical inner contour of the mouthpiece 8.

In effect, the conveyor channel 19 is formed as an undercut in the screw tip, the undercut being bounded at its inside by core section 18, being laterally open at its outside, and being covered by a ledge 30 whose outer surface is formed by surface portion 17.

Portions of the stream of material discharge over the cylindrical outer circumference 13 of the surface portions 15, 16 so that a relayering of the material takes place by the shear flow along the conveyance path over the outer circumference. In this respect, the stream of materials is pulled out into a thin-layered spirally extending string.

The outer circumference 13 of each of the screw tips 11 and 12 travels close to the inner surface 6 of the housing 7 and/or the distributor channel 9 with slight radial clearance.

In the case of the extruder with two screws 2, 3 as shown in FIG. 1 which interengage one another and scrape material from one another, the maximum clearance is equal to one-half the difference between the outer diameter da of the screw and the core diameter dk of the screw and thus the depth of thread of the screw channels 5 and 5'. As a minimum, the clearance is limited by the condition that the outside diameter ds of the screw tip corresponds, except for a slight slide clearance, to the axial spacing a between these screw tips which is established by the spacing between the extruder screws 2, 3. The screw tips 11, 12 are mounted on their respective extrusion screws 2, 3 so as to be angularly offset 180° from one another.

The back surface 24 of each screw tip facing the associated extruder screw is provided, as shown in FIG. 2, with a chamfer 23 which forms a passage at the end of the screw channels 5, 5' to the outer circumference 13 of the screw tips 11, 12 as evident in FIG. 1.

Figure 4:
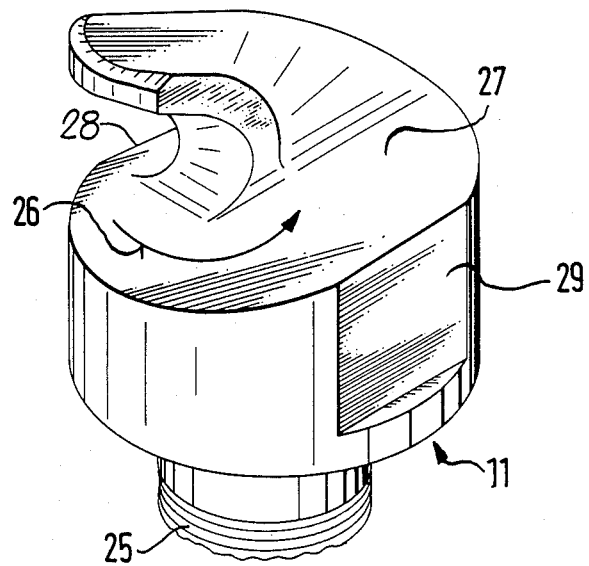
FIG. 4 is a perspective view of a modified embodiment of the screw tip.

In certain cases it is advantageous to form the individual surface portions 15, 16, 17 of the screw tips 11 as a continuous discharge surface 27 as shown in the embodiment of FIG. 4. Therein, the discharge surface 27 extends helically along the conveyor path 26 of the product in continuously ascending fashion and without transitions at a helix angle in the range of between 10 and 30 degrees.

The helix angle is measured along an imaginary surface line at a constant distance from the axis of rotation of the screw tip and is preferably 15 degrees.

The screw tip 11 thus constructed is particularly suitable for conveying highly abrasive mixtures of substances such as, for instance, polymers having a high filler content of glass fibers.

Also in the case of mixtures of substances which are relatively highly viscous, the constantly ascending continuous discharge surface makes possible an optimum flow of product. When the extruder screws 2 and 3 are each formed of individual screw elements which are threadably engaged one against the other behind the screw tip 11, the screw tip is formed with a threaded pin 25 and diametrically opposed flat key surfaces 28, 29 whereby the screw tip can be threadably engaged in a threaded bore (not shown) in the last screw element (not shown). The key surfaces 28, 29 extend substantially parallel to the radial edge 21.

As seen from the above, the screw tip of the invention is characterized by the helically ascending discharge surface which terminates in a radial discharge edge and by the formation of the conveyor channel 19 which extends from the discharge edge partially over the circumferential extent of the screw tip and especially over the semi-circular extent as seen in FIG. 3.

Although the invention has been described in relation to specific embodiments thereof, it will become apparent to those skilled in the art that numerous modifications and variations can be made within the scope and spirit of the invention as defined in the attached claims.

What is claimed is:

1. An extruder for the extrusion of a material composed of a mixture of substances comprising a housing having a feed channel, an extruder screw rotatably mounted in said feed channel for advancing the material in said channel to an outlet thereof, a screw tip coaxially mounted on said extruder screw and disposed with clearance in a distributor channel extending in prolongation of said feed channel to receive the material from the extruder screw and feed the material to a discharge outlet of the distributor channel, said screw tip having a discharge surface at an end of the screw tip remote from the extruder screw, said discharge surface including a plurality of surface portions ascending generally helically in the direction of flow of the material and forming a discharge edge extending substantially radially from a center axis of the screw tip to the periphery thereof, said screw tip being provided with an undercut forming a conveyor channel extending angularly from said discharge edge over a portion of the screw tip and radially from an inner core portion of the screw tip to the periphery of the screw tip whereat said conveyor channel is laterally open, said undercut forming a ledge which covers said conveyor channel, said ledge having an outer surface constituted by said discharge surface.

2. An extruder as claimed in claim 1 wherein said surface portions are substantially flat.

3. An extruder as claimed in claim 1 wherein said surface portions which form said discharge surface extend continuously at a helix angle of between 10° and 30° with respect to the axis of the screw tip.

4. An extruder as claimed in claim 3 wherein said helix angle is 15°.

5. An extruder as claimed in claim 1 wherein said core section has an outer surface which defines a concave boundary for said conveyor channel.

6. An extruder as claimed in claim 5 wherein said outer surface of the core section extends along a semicircular arcuate path.

7. An extruder as claimed in claim 1 wherein said screw tip includes a threaded pin for engaging in a threaded bore in said extruder screw.

8. An extruder as claimed in claim 1 comprising a second extruder screw arranged parallel to the first said extruder screw, each of the first and second extruder screws having a respective said screw tip mounted thereon.

9. An extruder as claimed in claim 8 wherein said extruder includes helical threads which interengage one another, said screw tips being mounted on said extruder screws at an angular offset of 180° from one another.

10. An extruder as claimed in claim 1 wherein said discharge surface has an outer periphery and is provided with a bevel at said outer periphery extending over a portion of the circumference of said screw tip.

11. An extruder as claimed in claim 10 comprising a mouthpiece on said housing, said distributor channel and discharge outlet being in said mouthpiece, said mouthpiece having a conical inner surface bounding said distributor channel, said bevel having a cone angle corresponding to the cone angle of said conical inner surface.

12. An extruder as claimed in claim 1 wherein said screw tip has an outer peripheral surface provided with diametrically opposed flat portions.

13. An extruder as claimed in claim 12 wherein said diametrically opposed flat portions extend substantially parallel to said radial discharge edge.

14. An extruder as claimed in claim 13 wherein said screw tips includes a threaded pin for engaging in a threaded bore in said extruder screw.

15. An extruder as claimed in claim 1 wherein said plurality of surface portions include first and second surface portions and an intermediate third portion merging with said first and second portions and extending radially inwards from the periphery of the screw tip to the axis thereof where the third portion connects with said discharge edge.

* * * * *